March 27, 1951 — I. G. TALTAVULL — 2,546,877
SYNCHRONOUS, SELF-EXCITED, SELF-REGULATED ELECTRICAL MACHINE Filed July 12, 1948 — 4 Sheets-Sheet 1

Inventor:
Ignacio Goytisolo Taltavull

March 27, 1951
I. G. TALTAVULL
2,546,877
SYNCHRONOUS, SELF-EXCITED, SELF-REGULATED
ELECTRICAL MACHINE
Filed July 12, 1948
4 Sheets-Sheet 3
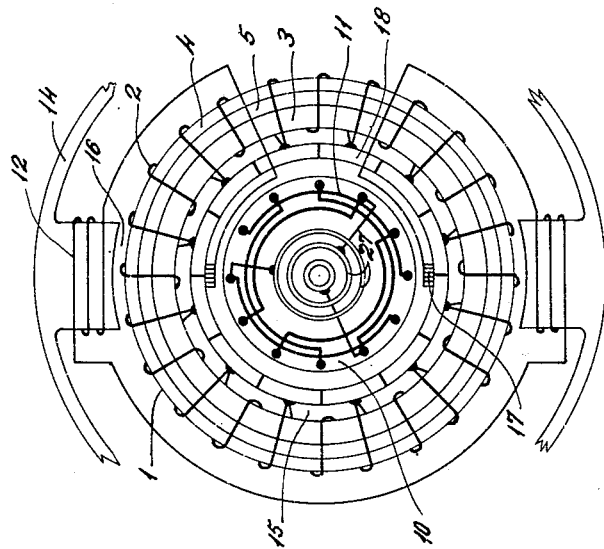
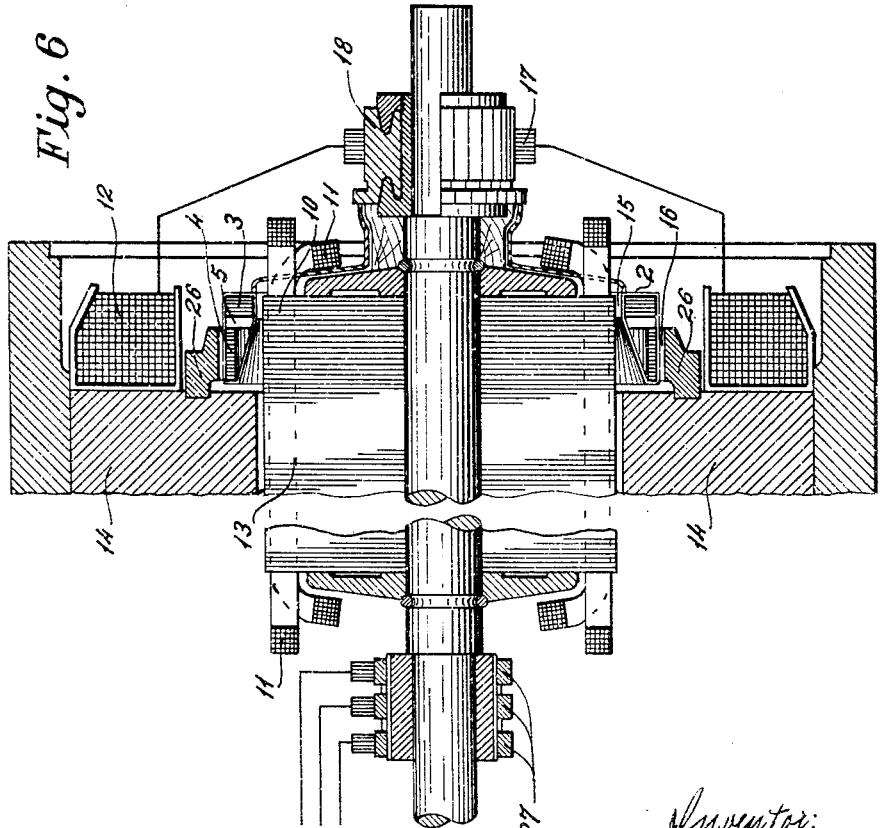

March 27, 1951     I. G. TALTAVULL     2,546,877
SYNCHRONOUS, SELF-EXCITED, SELF-REGULATED
ELECTRICAL MACHINE
Filed July 12, 1948                                          4 Sheets—Sheet 4
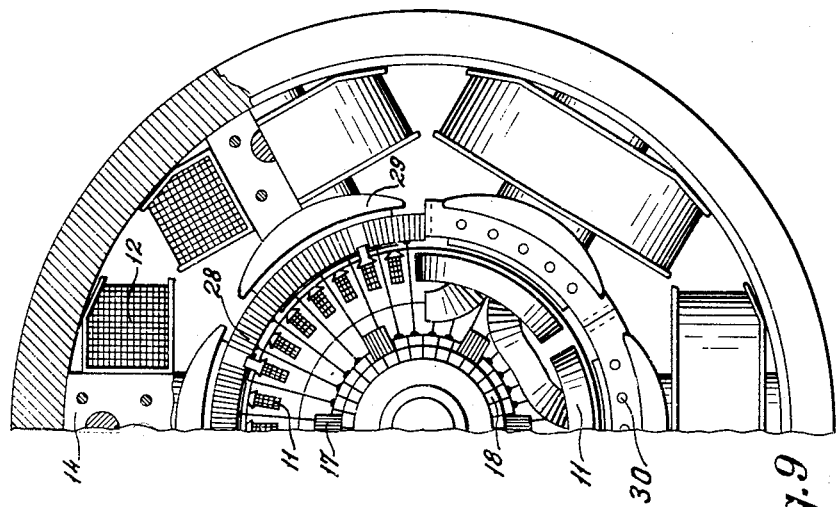
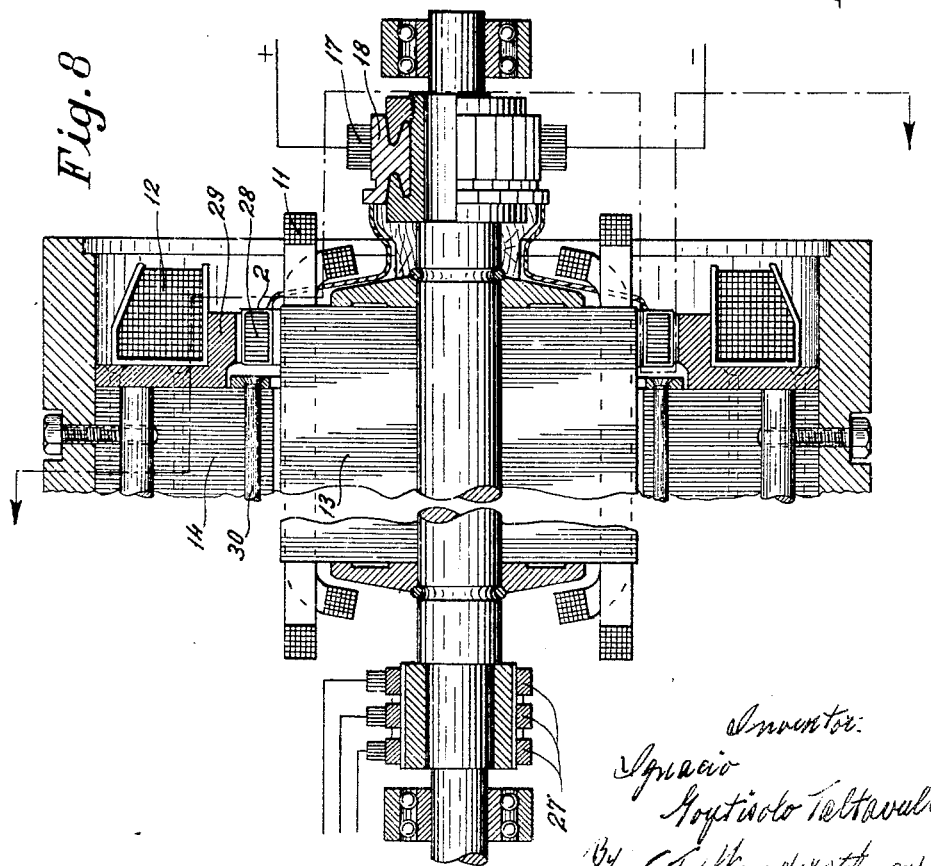

Patented Mar. 27, 1951

2,546,877

UNITED STATES PATENT OFFICE 2,546,877

SYNCHRONOUS, SELF-EXCITED, SELF-REGULATED ELECTRICAL MACHINE

Ignacio Goytisolo Taltavull, Barcelona, Spain

Application July 12, 1948, Serial No. 38,337
In Spain April 10, 1948

12 Claims. (Cl. 322—59)

The present invention is concerned with a solution of the problem of obtaining a new electrical machine, generator or motor of the synchronous type, in which it is possible to omit the exciting dynamo that ordinarily forms a separate machine, as well as the voltage regulating apparatus, both of which elements make the whole plant complicated and expensive, especially in the case of small and medium power installations.

The invention which forms the object of this patent consists essentially in combining in one single synchronous electrical machine a field magnet and an armature that may be on any suitable type, with a Gramme ring mechanically consolidated with the armature and composed of two annular magnetic cores separated from each other by an air gap and both being surrounded by a single winding. The Gramme ring is placed in such a manner that it will be submitted to the influence of the magnetic field of the field magnet and of the magnetic field of the armature. The effect of these two magnetic fields is to set up, in the Gramme ring, a compounded current which is rectified by means of a commutator or of a dry rectifier and conducted to the field magnet winding.

Although the machine works as a generator or as a motor, this current produced in the Gramme ring constitutes the exciting current of the machine, and because of the fact that it is due to the combination of the two magnetic fields, the result is that the excitation varies with the increase in the load of the machine, thus producing a self-regulating effect in the synchronous machine.

In some cases, when the machine is working as a motor, the two annular magnetic cores of the Gramme ring may be joined to form a single one, this single ring being so arranged as to be influenced on the one hand by the magnetic field of the field magnet and on the other hand by the magnetic field of the armature.

Figures 6 and 7, the latter being schematic, represent the application of the system in the case of a fixed field magnet with salient poles, the machine functioning as an alternator.

Figures 8 and 9 show the application of the system in the case of a field magnet with salient poles, the machine functioning as a motor.

Figure 1:
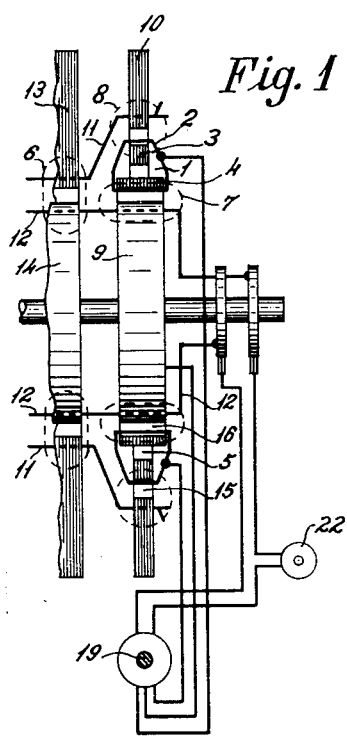
Figures 1 and 2 represent schematically the Gramme ring, the basis and foundation of the system, indicating the fields that act on it.
Figure 2:
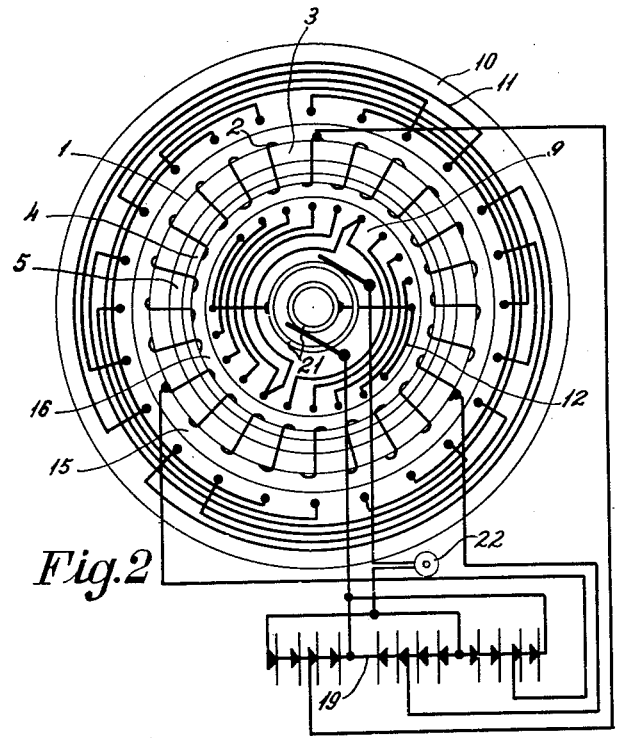

The Gramme ring 1 represented in the sketch in Figures 1 and 2, as well as in Figure 7, constitutes the armature of the exciter of the three-phase synchronous machine, and is placed inside the machine itself, and is subjected to the effects of the magnet field as well as those of the armature field of the synchronous machine. For this purpose the ring referred to has a single external winding 2, but inside it there are two cores 3 and 4 of laminated magnetc material constituting two concentric or co-axial magnetic rings separated by an air gap 5. According to the use required this whole piece is fixed (Figures 1 and 2) or rotating in space (Figure 7), but the two fields that act on it have a relative movement as regards the ring, and being moreover, synchronous with each other, owing to the fact that the rotating field of the synchronous machine is the result of the action of the magnet field, thus moving in solidarity with each other. The voltages induced by these fields in the Gramme winding produce currents that are rectified either through a dry rectifier 19, Figures 1 and 2, or through a commutator 18 with its brushes 17 (Figure 7). Thus, the fact is that, strictly speaking, over and above the synchronous generating machine or motor properly so called, constituted by field magnet winding 12, the field magnet core 14, the armature winding 11, the armature core 13, and comprising a magnetic zone encircled in the line 6 at its principal part, there exists also the Gramme ring which is the common armature of two other machines, one being the exciter and the other the regulator, each of them having its zone of magnetic activity, the one 7 being constituted by the annular core 4 of the Gramme ring over against the core 9 of the winding 12, and the other 8 by the annular core 3 of the Gramme ring over against the core 10 that corresponds to a prolongation of the armature winding 11. Both the magnetic zones 7 and 8 exercise an influence on the same external winding of the Gramme ring that passes through those fields in its relative movement, whereby the electromotive forces induced add up vectorially in a favorable manner due to the fact that owing to the ring form of the armature 2, the field produced by the field magnet 12 of the synchronous machine acts on the portion of each spiral of the winding of the Gramme situated at 180 electric degrees from the portion of the same spiral that is in its turn influenced by the revolving field produced by the armature 11 of the synchronous machine, which in this case acts as field magnet. Given that the current produced in the Gramme ring, once it has been rectified, goes to feed the field magnet 12 of the synchronous machine, which is at the same time that of the exciter there is a direct current generating machine that can develop the functions of a real exciter; and that, at the same time, the Gramme ring being subject to the action of the magnetic field of the armature of the three-phase synchronous machine, it has the benefit of an action productive of electromotive force and, consequently, of an inducing current for the same machine, of greater intensity in proportion as the current that circulates through the said armature be greater. Due to this, an increase of excitation is produced automatically in proportion to the increase in the load of the machine should the latter be functioning as a generator, or in proportion to the increase in the consumption of the machine should it be functioning as a motor, that is to say, that a self-regulating effect of the compounding is obtained for the synchronous machine. Of course, the above mentioned ring must be calculated in its dimensions and in its air gaps in accordance with the respective influence that each field has to exercise, and in the same way the winding must be applied partially to one only of the cores, a ring that may be made interchangeable for one and the same machine, according to the use that the said machine is intended to serve. It can be said in general terms that the magnetic core 4 affected by the magnet field of the synchronous machine has to attain powerful inductions, that is to say, it has to work beyond the already curved part of its magnetic characteristic, and also that the inductions of the core 3 affected by the armature of the machine will be weak, and furthermore, that the respective air gaps 16 and 15 will, in consequence, in one case be narrow and the other larger, it thus being possible to make the external characteristic whatever may be desired, that is to say, making it function as an alternator, a characteristic of horizontal compounding, or with a slight hyper-compounding up to a certain value of the load at which the voltage then falls with great rapidity.

In summation, the synchronous machine is constituted by the three windings of: the ring 2, the three-phase 11, the magnet 12 whose fields are mutually influenced among themselves, with three separate magnetic zones of action (6, 7 and 8) the electric circuits 2 and 11 remaining mechanically united to each other, and in their turn in relative movement with respect to the electric circuit 12, and the circuits 2 and 12 being joined one to the other electrically through a dry rectifier 19 and two slip rings 21 or through a commutator 18 with its brushes 17.

Figure 3:
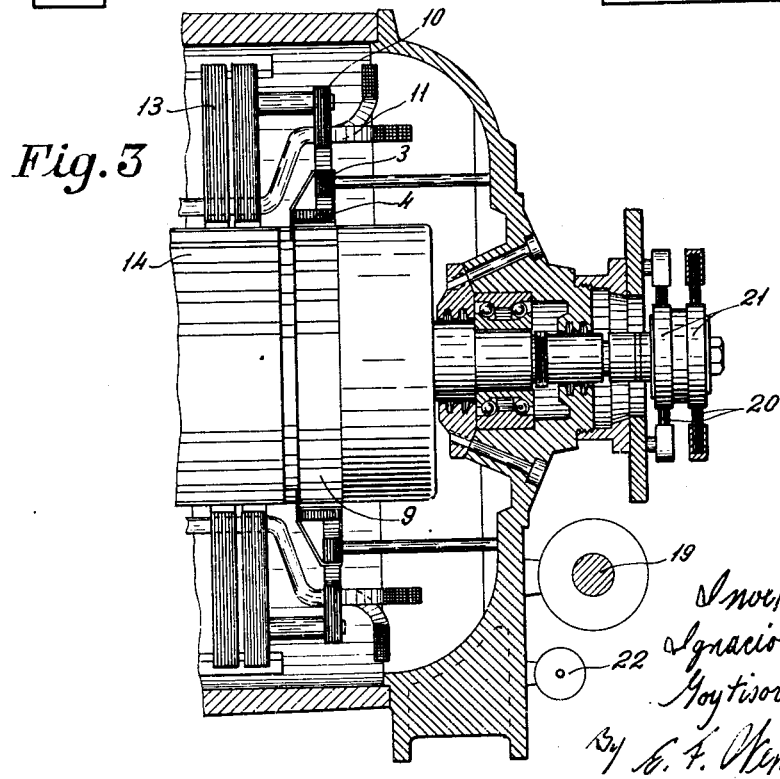
Figure 3 shows the application of the system in the case of the rotating field magnet with a constant air gap, the machine functioning as an alternator.

In Figure 3, there is shown a suitable arrangement for synchronous machines of a high number of revolutions. In this figure the gyrating magnet 14 is prolonged somewhat at 9 until it becomes possible to surround it by a Gramme ring 3—4, which is placed among the coil end of the stator winding that constitutes the armature of the synchronous machine, coil end 11 encircled by an electrical sheet ring 10, whereby, in this case, the Gramme ring remains fixed in space. The portion of the rotary field magnet 9 that faces the Gramme ring constitutes a core of steel of magnetic characteristics more pronounced than in the rest of the rotor and magnetically separated from it, with the object that the residual magnetism of the machine should be sufficient to start the current when it is functioning as a generator. In its turn, if the Gramme ring does not rotate and if it has a commutator, the latter would remain fixed, it being the brushes that would rotate. This case has been provided for by carrying three derivations of the Gramme situated at 120 electric degrees to a dry three-phasic rectifier 19, which, once the current has been rectified, carries it through some carbons 20 and two slip rings 21 to the rotary field magnet. By this means, the objectionable effects on the delicate mechanism of the brushes can be avoided, although such an arrangement can be made use of in practice.

The alternator described, being driven by a prime mover, for instance, a small steam turbine, must have a constant speed, this being requisite owing to the frequency of the current supplied, and this being attained by already known speed regulators with which such turbines are provided. If, then, the power factor of the installation remains constant, with a value equal to the unit, in the case of lighting installations, or without excessive variations when it is a question of feeding several motors, then the variations of the load will be translated in variations of excitation with scarcely any alteration in the voltage and without the need of any kind of regulating apparatus. Should this be desired, the influence that the variation of the resistance of the field magnet winding has on the fixety of the voltage owing to the difference in its temperature when the machine is first started and when its normal working has been established can be compensated, it being sufficient for this purpose to place in series with the field magnet winding a small resistance 22 of carbon discs submitted by a thermostat to a pressure varying according to the temperature with the consequent variation on its resistance in an opposite form to that of the field magnet, thus causing the joint resistance of the field magnet and of the carbon to be maintained approximately constant, and this automatically, in spite of the differences in their temperatures, and, also by hand with a small rheostat, the correction of the resistance of the field magnet circuit can be made.

Figure 5:
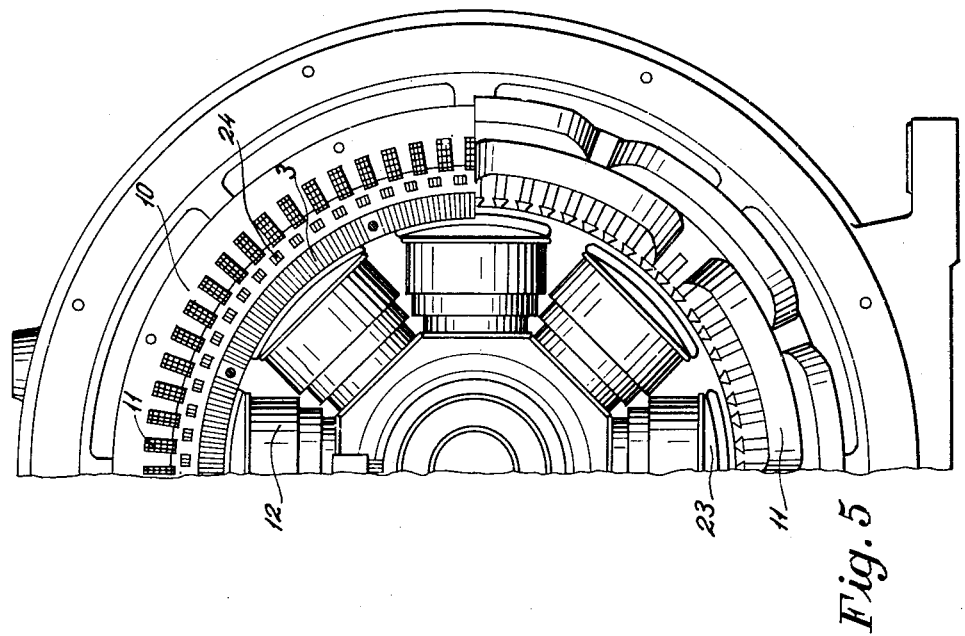
Figures 4 and 5 shows the application of the system in the case of the rotating field magnet with salient poles, the machine functioning as an alternator.
Figure 4:
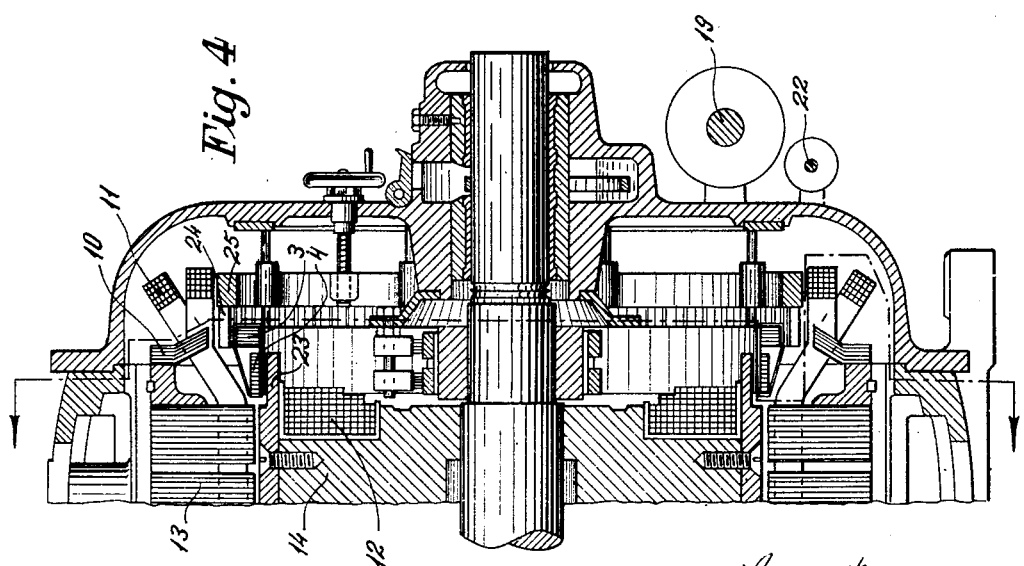

An application of the system to the case of a rotary field magnet with salient poles may be seen from Figures 4 and 5. In view of the disposition of the field magnet poles constituted by the cores 14 and the windings 12 it will be found desirable that the cores 3 and 4 of the Gramme ring, be coaxial instead of being concentric, with the object of gaining space and in order not to cause too much deformation by giving too many curves to the armature windings of the stator 11. The further advantage is procured, moreover, of a greater separation of the two cores from each other and of their undiminished mutual influence; the Gramme ring being then affected on the inside and the corresponding core 4 by the action of the expansion 23 of the polar piece which is opposite to it, and on its outside and the corresponding core 3 by the stator winding that encircles it. As for the rest, in the case where the Gramme ring is fixed, the same thing happens as in Figure 3, that to rectify the current it is found practical to use a dry rectifier 19 which not only does away with the necessity for the rotary brushes, but also for that of a commutator, which is always the part of a dynamo-electric machine that requires the most looking after, however interesting these rotary brushes may be in certain cases, especially if the machine is slow. Figure 4 also shows the resistance 22 for correcting the resistance of the magnet coil or winding in consequence of the variation in its temperature. The action of the rotary field of the armature may also be modified to suit the different types of installation in which the power factor is different, or for one and the same installation should the variations of the said factor be considerable in which case the presence of some segments or teeth 24 should be utilized. These are made of laminated magnetic material and fastened by a ring shaped non-magnetic support 25, in such a manner that they constitute a sort of prolongation of the teeth of the ring 10, in such a form as to vary the reluctance of the magnetic circuit, according to its greater or smaller introduction, in the air gap existing between the Gramme 3—4 and the ring 10 of the armature. For this purpose, the supporting ring 25 is arranged in such a manner as to be capable of an axial displacement. Naturally, this disposition of variation of the reluctance to the Gamme ring magnetic circuit armature can be applied to the case in Figure 3, in a completely analogous form to that of Figures 4 and 5.

In Figures 6 and 7, is shown the most suitable arrangement for the case in which the field magnet 12—14 is fixed, in which case the Gramme ring 3—4 then rotates in consolidation with the rotor 13—10 that bears the armature 11 of the three-phase synchronous machine, the said ring being subject to the action of the field of the said winding 11, which field remains fixed in space, since it is rotary in respect of the armature winding, but the winding, in its turn, rotates synchronously and in the opposite direction to form a part of the rotor. The Gramme ring, of a similar form to that in the aforementioned cases, is, then, subject in its cylindrical part on the inside to the action of the armature field of the machine, which affects the ring-formed core 3, and on its outside to the action of the prolongations 26 of the field poles 14 that affect the ring-shaped core 4, the desired effect of compounding thus being realised; with the peculiarity that, the Gramme ring being rotary, the rotor may be provided with the corresponding commutator 18 and the brushes 17 may be fixed, or otherwise, the commutator may be replaced by two slip rings that will pick up the alternating current produced at every two points situated at 180 electric degrees from the ring, current that would be rectified in the corresponding dry rectifier, the field poles of the machine being fed by it. In this sort of generating machine as in all others of its kind, with a rotary armature, the three-phase alternating current produced has to be picked up through three or four slip rings 27. In this case, too, the modifier for the magnetic reluctance represented in Figures 4 and 5, can be eliminated, since, there being a commutator, the resulting field that acts on the Gramme ring is displaced according to the value of the power factor, whereby the current captured by the brushes is influenced by the same value, as well as by the position of these same brushes. On the other hand, it is also possible to foresee, as in the foregoing types, a regulating resistance in the field magnet circuit in accordance with the temperature of its winding.

The machines described more particularly as generators may also be used as synchronous motors by simply making use of whatever kind of starting device is usually applied to this sort of motor. As an example as shown in Figures 8 and 9, that corresponds to the case of a synchronous machine with fixed field magnet 12 and 14, that is to say, similar to that of Figures 6 and 7, a machine in which, on applying a reduced voltage to the rotor 11, 13 through the intermediary of the slip rings 27, eddy currents are set up in the damping bars 30 placed in the polar expansion slots, the corresponding starting torque being produced; the precaution being taken to have the field magnet circuit quite open or quite shut through a suitable resistance until the slip reaches its minimum and an opportune moment arrives for the machine to come into synchronism, the field magnet circuit being then closed without resistance, which circuit will receive through the brushes 17 the current proceeding from the commutator 18. Such a three-phase synchronous motor would offer the advantage that its excitation would increase with the mechanical power supplied, whereby it would be able to supply a reactive current that would be constant whatever might be the motor rate developed, avoiding thereby the possibility of an out of step of the machine should excessive rates of load be applied. This would be due to the winding of the Gramme ring 2 which, in such a case, could contain a single ring-shaped core 28, subjected on the inside to the influence of the field produced by the currents absorbed by the rotor 11 and on the outside by the field of the prolongation 29 of the poles 14 of the stator, there being obtained, in this manner, that the current is compensated and picked up by the commutator 18. A similar disposition could be made use of for the case illustrated in Figures 4 and 5, but in which case the salient poles would form part of the rotor. Both in Figures 6 and 7 and in 8 and 9 the brushes have been drawn in an arbitrary position, to make it easier to show them.

In the same way, the Gramme type of ring mentioned above may be applied to synchronous induction motors, for instance, to those of the fixed field magnet type, wound in the manner of a three-phase winding, a winding that, during the starting, functions as the secondary of a synchronous motor with a starting rheostat, and later functions as a field winding of the synchronous machine. The Gramme ring will be arranged in a similar way to that of the motor in Figures 8 and 9, being subjected to the action of the field of the rotor winding that receives the current from three slip rings, as well as to the action of the exciting current of the stator, whereby, in this motor, on increasing the effort of the motor torque the value of the excitation current also increases, in the way that has been mentioned for the motor referred to in Figures 8 and 9. Such a synchronous induction motor could also be of the rotating field type with fixed armature.

I claim:

1. A synchronous electrical machine self-excited and self-regulated, comprising a field magnet, an armature and rectifying means, in combination with a Gramme ring formed by two ring-shaped magnetic cores separated from each other by an air gap and both being encircled by one single winding, the said Gramme ring being placed in an end of the machine between said magnet and said armature and subjected to the influence of their magnetic fields, and means for carrying the compounding current developed in said Gramme ring after being rectified by said rectifying means, as an excitation current, to the winding of said field magnet whereby a self regulating effect of the electrical machine is obtained.

2. An electrical machine comprising a field magnet and an armature in combination with a Gramme ring formed by a ring coil that encircles two laminated magnetic material cores placed concentrically and separated by an air gap; a rectification device that receives the alternating current produced in the Gramme ring and transforms it into direct current; a magnet coil that receives this direct current and produces a magnetic field, acting in its relative movement, on a portion of each spiral of the said Gramme ring and on the armature of this same synchronous machine; a laminated magnetic material ring surrounding the end of the armature winding of the said synchronous machine and is the seat of a revolving field produced by the circulating currents in the said armature winding, a revolving field that acts, in its turn, on the above mentioned Gramme ring in a portion of each spiral opposite the portion that receives the influence of the field magnet, there being produced in the Gramme ring itself, in consequence of the sum of both influences, an electromotive force more or less powerful in proportion to the current that circulates through the armature winding.

3. An electrical machine comprising a field magnet and an armature in combination with a Gramme ring formed by a ring coil that encircles two laminated magnetic material cores placed coaxially and separated by an air gap; a rectification device that receives the alternating current produced in the Gramme ring and transforms it into direct current; a magnet coil that receives this direct current and produces a magnetic field, acting in its relative movement, on a portion of each spiral of the said Gramme ring and on the armature of this same synchronous machine; a laminated magnetic material ring surrounding the end of the armature winding of the said synchronous machine and is the seat of a revolving field produced by the circulating current in the said armature winding, a revolving field that acts, in its turn, on the above mentioned Gramme ring in a portion of each spiral opposite the portion that receives the influence of the field magnet, there being produced in the Gramme ring itself, in consequence of the sum of both influences, an electromotive force more or less powerful in proportion to the current that circulates through the armature winding.

4. In the electrical machine as claimed in claim 1, the disposition of the Gramme ring, placed to surround the prolongation of the field magnet rotor of a smooth cylindrical type of the synchronous machine, a Gramme ring that is separated by an air gap from the said rotor, a Gramme ring that is, in its turn, embraced by the laminated magnetic material ring that surrounds the end of the armature winding that forms part of the stator of the said synchronous machine, and there being produced in the Gramme ring fixed to the stator currents that are rectified and conducted through some slip rings to the armature winding of the rotor.

5. In the electrical machine as claimed in claim 1, the disposition of the prolongation of the field magnet rotor, a prolongation that contains a core of steel of superior magnetic characteristics to those of the rest of the rotor, with the object of assuring a sufficient residual magnetism for the starting of the machine.

6. In the electrical machine as claimed in claim 1, the disposition of an additional resistance, placed in series with the circuit of the rotor, with the object of automatically compensating for the variations in the resistance of the field magnet set up in consequence of the variations in its tempertaure.

7. In the electrical machine as claimed in claim 1, the disposition of some segments or teeth made of electrical sheet and placed in a ring shaped support that is situated in the air gap or near to it, between the Gramme ring and the armature winding of the syncronous machine, there being brought about through the axial displacement of the whole series of segments a smaller or greater reluctance according to whether it is desired that the action of that winding on the Gramme ring should be respectively greater or smaller.

8. In the electrical machine as claimed in claim 1, the variant in the disposition of the Gramme ring, that is placed near to but separated by an air gap from some expansions of the polar parts of the rotor of the synchronous generating machine of the salient poles type, a Gramme ring that is in its turn, encircled by a laminated magnetic material ring that embraces the end of the armature winding that forms part of the stator of the same synchronous machine, and of which the Gramme ring is fixed to, though separated from it by a suitable air gap.

9. In the electrical machine as claimed in claim 1, the disposition of the Gramme ring that encircles closely, but remaining separated from them by an air gap, some prolongations of some polar expansions that contain dumping bars of the synchronous machine in this case arranged to function as a motor, a Gramme ring that, on the other hand, is encircled by the armature winding of the stator of the machine itself.

10. In the electrical machine as claimed in claim 1, the disposition of the Gramme ring, that encircles the armature rotor of a synchronous machine, and separated from it by a certain air gap, the Gramme ring being, however, mechanically fixed to the rotor, a Gramme ring that, on the other hand, has its outer face opposite to some polar expansions from which it is separated by an air gap, polar expansions belonging to the field magnet poles of the machine, which in this case are immobile, field magnet poles that receive the current produced into the Gramme ring through the intermediary of a commutator and some brushes, field magnet poles that contain some damping bars, should the machine be functioning as a motor.

11. In the electrical machine as claimed in claim 1, the disposition of the Gramme ring, that encircles and forms an integral part of the armature rotor of a synchronous machine with immobile salient poles near which the said Gramme ring slides, field magnet poles that receive the alternating current produced in the rotating Gramme ring through some slip rings, but with the opportune interposition of a dry rectifier that transforms the said current from alternating to direct, the machine being able to function as a motor or as a generator.

12. In the electrical machine as claimed in claim 1, the disposition of the Gramme ring, which encircles the rotor of a synchronous induction motor, from which rotor the Gramme ring is separated by a certain air gap, the two continuing to move as one piece, a rotor that receives through three slip rings the outer feed current of the motor, the three phase winding of the stator being the seat of the currents induced during the period of synchronous starting with the starting rheostat and the seat of the current producing a magnet field during the period of synchronous working, a stator winding that by one of its heads encircles the Gramme ring, leaving an air gap between the said Gramme ring and the magnetic ring that encircles the said portion of the stator winding, whereby the said Gramme ring comes under the influence of the field of the rotor and of the stator, there being produced an electromotive force that, being commuted through a commutator and some brushes, will go to feed the stator winding as soon as the machine has gone into synchronism, after switching over from the starting period to the synchronous working.

IGNACIO GOYTISOLO TALTAVULL.

REFERENCES CITED

The following references are of record in the file of this patent:

UNITED STATES PATENTS

| Number | Name | Date |
|---|---|---|
| 1,614,092 | Weichsel | Jan. 11, 1927 |